No. 772,811. PATENTED OCT. 18, 1904.
A. C. LUKEHART.
NUT LOCK.
APPLICATION FILED JULY 25, 1904.
NO MODEL.

Witnesses
Inventor
A. C. Lukehart
Attorneys

No. 772,811. Patented October 18, 1904.

UNITED STATES PATENT OFFICE.

ALBERT C. LUKEHART, OF FALLS CREEK, PENNSYLVANIA.

NUT-LOCK.

SPECIFICATION forming part of Letters Patent No. 772,811, dated October 18, 1904.

Application filed July 25, 1904. Serial No. 218,076. (No model.)

*To all whom it may concern:*

Be it known that I, ALBERT C. LUKEHART, a citizen of the United States, residing at Falls Creek, in the county of Clearfield, State of Pennsylvania, have invented certain new and useful Improvements in Nut-Locks; and I do hereby declare the following to be a full, clear, and exact description of the invention, such as will enable others skilled in the art to which it appertains to make and use the same.

This invention relates to nut-locks, which name is commonly given to all contrivances designed in any way to hold a nut in any position to which it may be turned in screwing it home. There are two general classes of these devices—one in which no provision is made for turning the nut-lock and another in which a retrograde movement of the nut is provided for. My invention belongs to the latter class and is designed for the widest range of use.

My invention consists of a dog or pawl pivoted in a recess formed in the head of the nut, the free end of which dog is adapted to be pressed by means of a spring into engagement with one of the ratchet-teeth of the several rows cut longitudinally in the threads of the bolts upon which the nuts are turned, and thus hold the nut against retrograde movement. A spring or other device arranged in a recess in the opposite side or end of the nut is capable of being moved and, through an operative connection with the first-mentioned spring, of releasing the dog and allowing the spring to be turned back, all as will be hereinafter more fully described in connection with the annexed drawings, and letters of reference marked thereon, forming a part of this specification.

Figure 1:
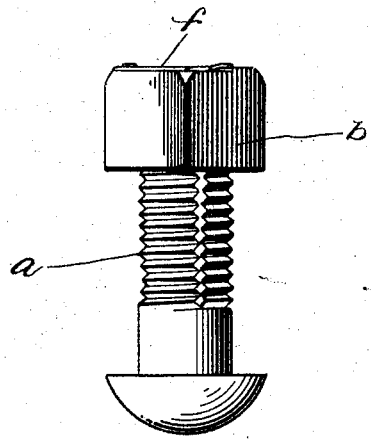
Figure 2:
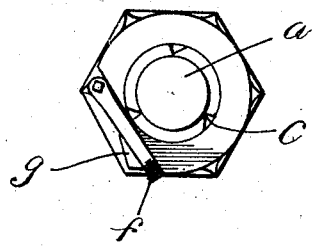
Figure 3:
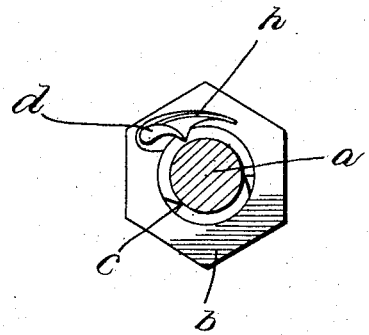
Figure 4:
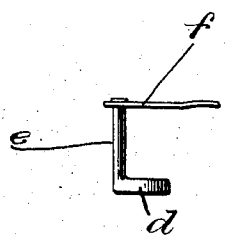

Of the drawings, Figure 1 is an elevation of the bolt and nut. Fig. 2 is a top plan view. Fig. 3 is a bottom plan view of the nut, the bolt being shown in section. Fig. 4 is an elevation of the pawl.

Referring now to the drawings, $a$ designates a bolt which may be of the form shown or any other needed for use. $b$ is the nut, turned on the screw-threaded part of the bolt. The latter has one or more lines or kerfs or ratchet-teeth $c$ cut therein, as shown, that may be engaged by the end of the dog or pawl $d$, arranged to operate in a recess formed in the bottom face of the nut, and a vertical shank $e$ extends up in a recess formed in the side of the nut to the top, wherein in a top recess it is provided with a flat spring $f$, adapted to be operated vertically, so that it may be lifted up at its outer end and moved laterally to one side or the other of a vertical lug $g$. A spring $h$ in the bottom recess of the nut and which is controlled by the position of the flat spring $f$ is arranged so that it may be made to bear against the dog $d$ and hold it in engagement with the ratchet-teeth formed on the screw-threads on the bolt.

In operation, the spring $f$ being moved outside the lug $g$, the pawl will be released and the nut will be turned up or to any position it is desired to have it, when the flat spring will be raised and moved over the lug $g$ inside of the same, and the spring $h$ below will act on the dog $d$ and cause it to engage a ratchet-tooth $c$, formed on the thread of the bolt, and hold the nut in fixed position.

The utility of the invention seems to be so obvious as not to call for explanation. The device is at once simple in construction and entirely efficient and durable. It is, as before stated, capable of a wide range of use, since there is nothing in the way of its employment where an ordinary nut may be used.

The nuts and bolts may be made separately and sold as complete articles of manufacture.

The observation is made that it is known that mechanical changes may be made in the form and arrangement of parts without departing from the nature or spirit of the invention.

What is claimed is—

The nut for a bolt, hereinbefore set forth, having recessed faces, a pawl in the lower face, a regulating-spring in its upper face, a lug in the recess of the upper face on either side of which the coöperating regulating-spring may be removed, and a connecting-shank between the regulating-spring and pawl, all combined and operating substantially as described and illustrated.

In testimony whereof I affix my signature in presence of two witnesses.

ALBERT C. LUKEHART.

Witnesses:
J. J. LUKEHART,
S. G. RITCHEY.